July 29, 1941.  F. CANAAN  2,250,702
TURBOTRANSMISSION FOR BRAKING OF VEHICLES
Filed Feb. 1, 1938   2 Sheets-Sheet 2
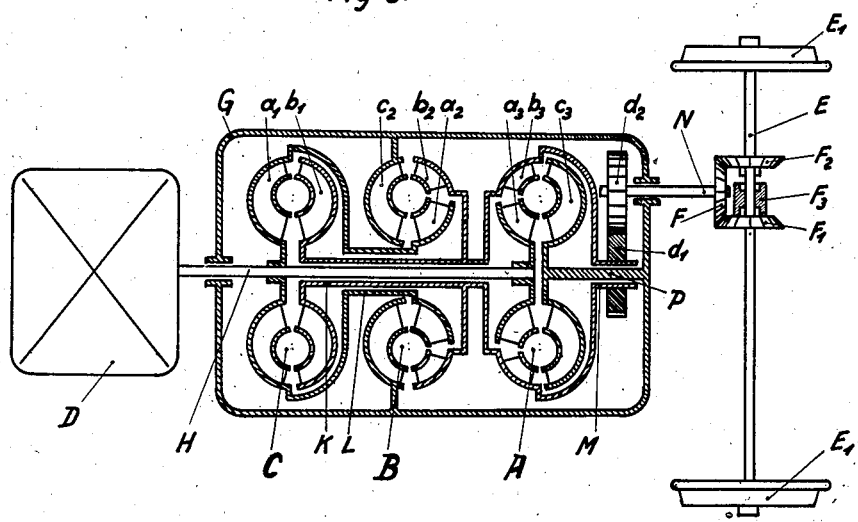
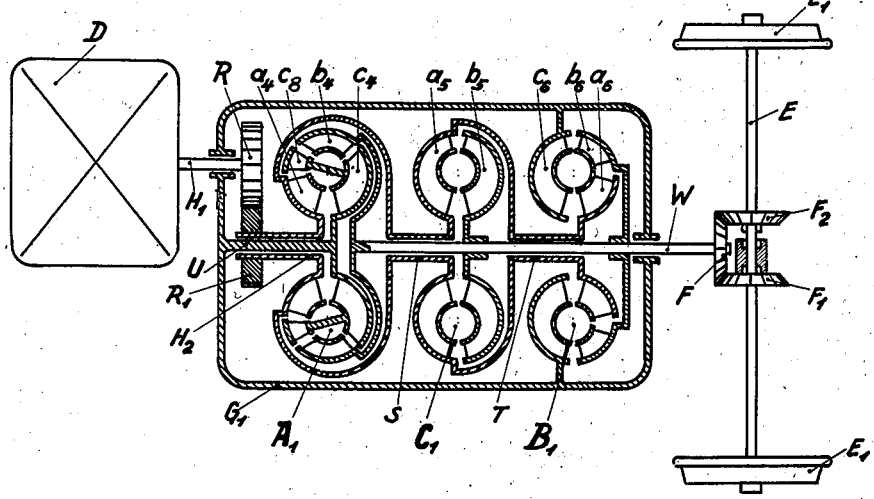
Inventor
FAIC CANAAN
BY
Toulmin & Toulmin
Attorneys Patented July 29, 1941

2,250,702

UNITED STATES PATENT OFFICE 2,250,702

TURBOTRANSMISSION FOR BRAKING OF VEHICLES

Faic Canaan, Heidenheim-on-the-Brenz, Germany, assignor to American Voith Contact Company, Inc., New York, N. Y.

Application February 1, 1938, Serial No. 188,095
In Germany February 3, 1937

3 Claims. (Cl. 192—4)

This invention relates to fluid power transmitting devices, and in particular, to turbotransmissions for braking vehicles, especially rail vehicles.

One object of this invention is to provide a braking turbotransmission for vehicles, wherein the braking effect varies steadily in the same direction with a variation in the speed of the vehicle.

Another object is to provide a braking turbotransmission, wherein the direction of flow of the working fluid remains continually in the same direction during all working conditions calling for such braking effects.

Another object is to provide a braking turbotransmission, wherein the diameters upon which the intake and outlet cross sections of the primary rotor, secondary rotor and guide wheel, as well as the entrance and exit angles thereof, are chosen of such values that under all working conditions the working fluid pursues the same direction of flow within the working circuit in the turbotransmission.

Another object is to provide a braking turbotransmission, wherein the braking moment produced by the braking torque converter thereof varies evenly with the variation of the vehicle speed and gradient so as to enable the production of an effective braking action under different working conditions and at different speeds.

Another object is to provide a braking torque converter with the primary rotor, secondary rotor and guide wheel arranged in such a manner that the curves showing the relationship between the speed of the vehicle and the braking moment proceed in the same directions with partial or complete filling of the transmission without reversals of direction between the limits of the working conditions.

In the drawings:

Figure 6 is a diagrammatic plan view, partly in section, showing the arrangement of the braking turbotransmission, diagrammatically shown in Fig. 4.

Figure 7 is a view similar to Figure 6, but of a modified arrangement employing a hydraulic braking unit shown in Figure 5.

Figure 2:
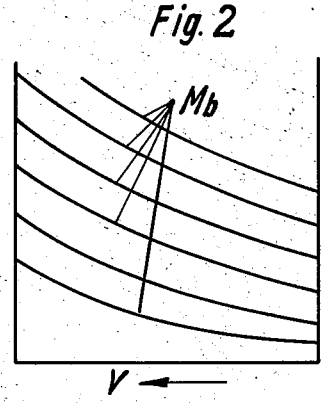
Figure 2 is a graphical illustration of the variation in the braking moment of the braking torque converter of this invention, with partial and complete filling of the converter.

In general, the braking turbotransmission of this invention consists of a braking torque converter in which the primary rotor, secondary rotor and guide wheel are arranged in the foregoing order to insure that the working fluid pursues the same direction of flow between the maximum and minimum working limits of the converter. This arrangement produces an even and non-reversing change in the braking moment as the speed of the vehicle increases or decreases. In the braking torque converter of the present invention the diameters at the intake and outlet cross section of the converter, as well as the entrance and exit angles of the primary rotor, secondary rotor and guide wheel, are so chosen that this uniform direction of flow is maintained constantly under operating conditions in a given direction. The braking moment may be given varied amounts of action by partially or completely filling the converter, as shown in Figure 2.

Figure 1:
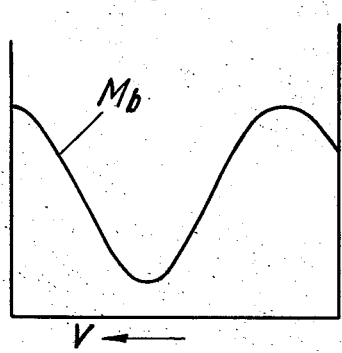
Figure 1 is a graphical illustration of the variation in the braking moment of a prior art braking converter, as in Figure 3, wherein the direction of flow of the working fluid varies between the maximum and minimum limits of the speed of the vehicle.

Hitherto, where ordinary torque converters have been used for the braking of vehicles, particularly rail vehicles, it was necessary to place the reverse gearing of the axle in reverse position before the commencement of the downward travel. This was necessary in order to cause the secondary rotor of the torque converter to rotate in opposition to the primary rotor, and thereby produce a braking effect. This requirement of placing the reverse gearing in reverse position in order to employ the braking effect of the torque converter required that the vehicle be brought to a standstill before the gearing could be shifted into reverse position. Hitherto, where a special torque converter was provided for braking purposes, the opposing action of the primary and secondary rotors was brought about by means of a stationary reversing guide wheel installed between these rotors, in order to provide a sufficient braking effect. In this arrangement, however, there arises the disadvantage that the direction of flow of the working fluid reverses itself within the converter at certain speeds of the vehicle, as shown in Figure 1. In brief, at low vehicle speeds the braking moment first increases with the increasing speed of the vehicle, then sharply decreases, and finally increases again toward the maximum speed of the vehicle. With such performance characteristics, therefore, the braking torque converter of the prior art has been capable of exerting an effective braking action under restricted conditions only.

Figures 3, 4:
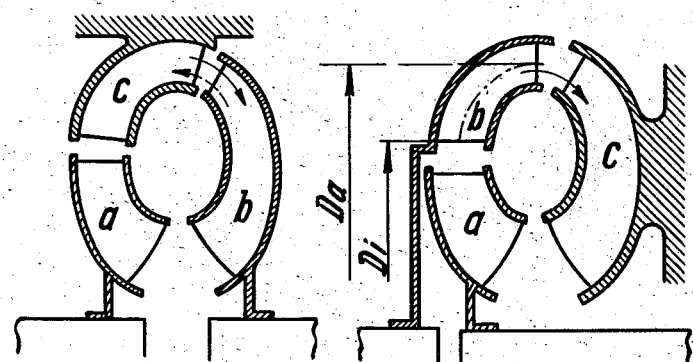
Figure 3 is a diagrammatic view showing a braking torque converter of a prior art type, producing the braking moment performance characteristics shown in Figure 1.
Figure 4 is a diagrammatic view showing a braking torque converter according to the present invention, producing the braking moment performance characteristics shown in Figure 2.

Thus, in the prior art braking torque converter of Figure 3, the stationary reversing guide wheel $c$ is arranged between the primary rotor $a$ and the secondary rotor $b$. The fluid in flowing through the circuit, therefore, proceeds through the guide wheel $c$, from the primary rotor $a$, before it reaches the secondary rotor $b$. As previously stated, the desired direction of flow is in a single direction, as indicated by the solid line arrow in Figure 3, but the direction of flow reverses at certain speeds, as indicated by the dotted line arrow in Figure 3 and shown by the undulating curve $M_b$ in Figure 1. Thus, the braking moment $M_b$ of this prior art braking torque converter exhibits an irregular variation as the vehicle speed V increases.

According to the present invention, however, (Figure 4) the secondary rotor $b$ is positioned immediately beyond the primary rotor $a$, with the guide wheel $c$ on the opposite side of the secondary rotor $b$ from the primary rotor $a$, considering the direction of flow as indicated by the solid line arrow in Figure 4. In this arrangement, the entrance and exit diameters $Di$ and $Da$ of the blades of the primary and secondary rotors are so chosen, together with the entrance and exit angles of the secondary rotor $b$ and primary rotor $a$, that the flow of the working fluid is constantly in the direction of the arrow (Figure 4) throughout the working range of the vehicle, namely, the entire speed range from a standstill to the maximum speed attainable, as indicated in Figure 2.

The braking moment of the braking torque converter according to Figure 4 may be likewise given different magnitudes by filling the apparatus with different amounts of fluid. The various curves $M_b$ (Figure 2) showing the variation of the braking moment with the increasing speed of the vehicle, result from such different fillings of the torque converter. Each filling level of the torque converter thus covers a different range of braking moments for the speed range of the vehicle, as shown by each curve $M_b$. Thus, by partially filling the apparatus the braking moment can be varied satisfactorily throughout a wide range over all practical braking conditions required during the operation of the vehicle. For bringing about a partial filling of the apparatus, either the rate of revolution of the filling pump may be varied, or the leakage loss of the converter altered, or both of these expedients varied simultaneously. Moreover, an approximately equal effect can be obtained through a throttling of the pump pressure. In many cases, under ordinary operating conditions, it suffices to vary only the rate of revolution of the filling pump and to adopt a fixed magnitude of the leakage loss as obtained once and for all through running trials of the apparatus. Any suitable filling and emptying arrangement may be employed, one such arrangement being disclosed and claimed in my copending application, Ser. No. 107,741, filed October 26, 1936, for Control means for fluid power transmitters.

Thus, according to the present invention, the direction of flow of the fluid remains invariable throughout the working range of the apparatus (Figure 2), and there occurs no irregularity in the variation of the braking moment as in the prior art (Figure 1). By this partial filling of the converter to different levels according to the particular operating conditions encountered, an effective braking action can be obtained to meet the particular working conditions most efficiently, and the braking moment curves $M_b$ (Figure 2) run evenly and without irregular rises or declines. With the apparatus of the present invention, therefore, the braking torque converter can be readily adapted to perform most efficiently under a given set of working conditions, particularly as to running speed of the vehicle and gradient of the rail line or road bed.

Figure 5:
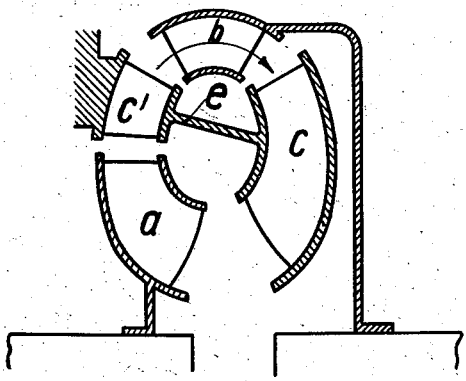
Figure 5 is a diagrammatic view showing a modified braking torque converter according to the present invention, likewise producing the braking moment performance characteristics shown in Figure 2.

In the modification shown in Figure 5, the guide wheel is arranged in multiple parts $c$ and $c'$, the part $c$ being arranged in the order of Figure 4, and connected to the part $c'$ by the member $e$. The part $c'$ is secured to the frame of the apparatus in a stationary manner, as the guide wheel $c$ in Figure 4. It is immaterial to the purposes of the invention whether the braking torque converter is constructed in a single stage or in multiple stages. In Figure 5 it will be seen that the diameter of the outlet of the secondary rotor $b$ is equal to the diameter of the inlet thereof; that is, $Da$ equals $Di$.

Figure 6 shows one embodiment of the invention shown diagrammatically in Figure 4 for a rail vehicle, the frame of which is being omitted to show the operating elements more clearly. The arrangement consists of an engine or prime mover D, such as an internal combustion engine, arranged to drive a transmission shaft H. The latter enters a housing G containing a hydraulic driving transmission, generally designated B and C, and including a braking unit A. The transmission unit C is provided with a primary rotor $a'$, mounted upon the transmission shaft H. The secondary rotor $b'$ is mounted upon a hollow shaft K, through which the transmission shaft H passes. The primary rotor $a^2$ of the driving transmission unit B is mounted upon another hollow shaft L. The secondary rotor $b^2$ of the transmission unit B is also mounted upon the hollow shaft K. The stationary guide wheel $c^2$ of the unit B is attached to the housing G.

Likewise mounted on the transmission shaft H is the primary rotor $a^3$ of the braking torque converter, the secondary rotor $b^3$ of which is connected to the hollow shaft K on one side and to the hollow shaft M, to which also is connected a gear $d'$, meshing with and driving a gear $d^2$. The gear $d^2$ is mounted upon a shaft N carrying a bevel gear F. The bevel gear F meshes with bevel gears $F'$ and $F^2$ mounted to rotate loosely upon the vehicle axle E, and operatively connected thereto by means of the sliding clutch collar $F^3$. The clutch collar $F^3$ is keyed or otherwise drivingly connected to axle E, and carries teeth for selectively engaging either one or the other of the gears $F'$ or $F^2$ so as to drive the vehicle in a forward or reverse direction. To the housing G is connected a shaft P, passing loosely through the hollow shaft M and gear $d'$, and terminating in the stationary guide wheel $c^3$ of the braking unit A. The axle E is provided on either end with driving wheels E' adapted to roll upon the tracks in the usual way.

In the operation of the braking arrangement shown in Figure 6, the driving units C and B of the hydraulic driving transmission are emptied of their working fluid and the braking unit, consisting of the hydraulic torque converter A, is filled wholly or partially with working fluid. Due to the momentum of the vehicle and the engagement of its wheels E' with the tracks, the secondary rotor $b^3$ of the braking torque converter A is driven from the wheels E' by means of axle E, the bevel gears F' or $F^2$, the bevel gear F, the shaft N, the gears $d^2$ and $d'$ and the hollow shaft M on which the secondary rotor $b^3$ is mounted. The travelling speed of the vehicle is then braked by the torque converter A through the action of its guide wheel $c^3$. By partially filling the braking torque converter the braking moment can be varied throughout a wide range of all practical braking conditions required during the operation of the vehicle.

In the modification shown in Figure 7 the motor D drives the shaft H', gear R, gear R' and the hollow transmission shaft $H^2$ in the usual manner. Upon the hollow transmission shaft $H^2$ is mounted the primary rotor $a^4$ of the braking torque converter A', the secondary rotor $b^4$ of which is mounted upon a shaft W, to which also are connected the secondary rotors $b^5$ and $b^6$ of the driving transmission C' and B'. The primary rotor $a^5$ of the driving transmission C' is mounted upon the hollow shaft S, joining it with the primary rotor $a^4$ of the braking torque converter A', the primary rotor $a^6$ of the driving transmission B' is mounted upon the hollow shaft T, joining it with the primary rotor $a^5$ of the driving transmission C'. To the housing G' is connected a shaft U, passing loosely through the hollow shaft $H^2$ and gear R', and terminating in the stationary reversing guide wheel $c^4$, of the braking unit A'. Connected to the reversing guide wheel $c^4$ is a guide wheel $c^8$. The stationary guide wheel of the driving transmission B' is attached to the housing G'. The shaft W terminates in a bevel gear F adapted selectively to drive one of the bevel gears F' or $F^2$, drivingly connected to the axle E carrying the wheels E', in a way similar to that described for Figure 6.

In the operation of the braking arrangement shown in Figure 7 the transmission units C' and B' are adapted to be emptied of their working fluid while the braking unit A is wholly or partially filled with fluid. The secondary rotor $b^4$ of the braking torque converter A' is now driven by the momentum of the vehicle, in a manner similar described in connection with Figure 6.

In both of the embodiments shown in Figures 6 and 7 the driving transmission units B and C or $B_1$ and $C_1$, respectively, are driven by the driving engine D in one direction only. The braking torque converters A and $A_1$ are also driven in the same single direction. None of these three units is reversibly rotated but reversal is accomplished by shifting the sliding element $F_3$ of the mechanical reversing mechanism on the axle E of the vehicle.

Having thus fully described my invention, what I claim as new and desire to secure by Letters Patent is:

1. A vehicle comprising means for driving the driven members of the vehicle, and a turbobraking convertor adapted to receive working fluid for braking said driven members, said convertor including a primary rotor drivingly connected to said driving means, a stationary reversing guide wheel, and a secondary rotor drivingly connected to said driven means, said secondary rotor being disposed between the primary rotor and the reversing guide wheel and being so arranged radially that the fluid entrance and exit portions of said secondary rotor are on substantially equal diameters, whereby the direction of flow of said working fluid during the braking operation shall be maintained in a unidirectional path, said path being from the primary rotor to and through the secondary rotor and from there to the reversing portion of the stationary guide wheel.

2. A vehicle comprising driving means for driving the wheels of the vehicle, and a braking convertor, adapted to receive working fluid for braking said vehicle, said convertor including a primary rotor drivingly connected with said driving means, a secondary rotor drivingly connected with the wheels of said vehicle, and a stationary reversing guide wheel adapted to reverse the working fluid in said convertor to cause a braking effect on the secondary rotor, the diameter of intake of said secondary rotor being equal to the diameter of outlet of said secondary rotor, whereby to prevent reversal of the direction of flow of the working fluid in its movement from the primary rotor to and through the secondary rotor.

3. A vehicle comprising means for driving the wheels of the vehicle, and a braking convertor adapted to receive working fluid, for braking said wheels, said convertor including a primary rotor or pumping wheel drivingly connected with said driving means, a secondary rotor or turbine wheel drivingly connected with said wheels and arranged so as to immediately follow said primary rotor or pump wheel when following the direction of flow of working fluid in said convertor, and a stationary reversing guide wheel for reversing the working fluid in said convertor to cause a braking effect on said secondary rotor, the diameter of inlet of said secondary rotor being not greater than the diameter of outlet of said secondary rotor, whereby to prevent reversal of the direction of flow of the working fluid in its movement from the primary rotor to and through the secondary rotor.

FAIC CANAAN.